US012462682B2

(12) United States Patent
Rainer

(10) Patent No.: US 12,462,682 B2
(45) Date of Patent: Nov. 4, 2025

(54) METHOD FOR CONTROLLING A FLOW OF TRAFFIC ON A ROUNDABOUT

(71) Applicant: AUDI AG, Ingolstadt (DE)

(72) Inventor: Julia Rainer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 111 days.

(21) Appl. No.: 18/001,248

(22) PCT Filed: May 25, 2021

(86) PCT No.: PCT/EP2021/063811
§ 371 (c)(1),
(2) Date: Dec. 8, 2022

(87) PCT Pub. No.: WO2021/249755
PCT Pub. Date: Dec. 16, 2021

(65) Prior Publication Data

US 2023/0222910 A1 Jul. 13, 2023

(30) Foreign Application Priority Data

Jun. 10, 2020 (DE) ..................... 10 2020 115 431.3

(51) Int. Cl.
*G08G 1/0968* (2006.01)
*G08G 1/01* (2006.01)
(Continued)

(52) U.S. Cl.
CPC ..... *G08G 1/096811* (2013.01); *G08G 1/0133* (2013.01); *G08G 1/0141* (2013.01);
(Continued)

(58) Field of Classification Search
CPC ........... G08G 1/096811; G08G 1/0133; G08G 1/0141; G08G 1/0145; G08G 1/095783;
(Continued)

(56) References Cited

U.S. PATENT DOCUMENTS 9,672,734 B1 6/2017 Ratnasingam
2009/0109061 A1 4/2009 McNew et al.
(Continued)

FOREIGN PATENT DOCUMENTS

CN 107111946 A 8/2017
CN 107949875 A 4/2018
(Continued)

OTHER PUBLICATIONS

Chen et al., "Cooperative Intersection Management: A Survey," IEEE Transactions on Intelligent Transportation Systems 17(2):570-586, Feb. 2016.
(Continued)

*Primary Examiner* — Aniss Chad
*Assistant Examiner* — Stephanie T Su
(74) *Attorney, Agent, or Firm* — Seed Intellectual Property Law Group LLP

(57) ABSTRACT

A method for controlling a flow of traffic on a roundabout, wherein the flow of traffic is controlled by a traffic control unit by which road users that have entered the roundabout and/or are approaching the roundabout in order to enter it are networked in a network and communicate by way of messages, and wherein, in order to enter, a road user transmits a message containing a request to the traffic control unit provides for entry by the respective road user to be preceded by the flow of traffic that is on the roundabout being determined on the basis of the messages, wherein a message containing a control signal is generated for the respective entering road user in order to communicate whether and/or along which route the road user can travel on the roundabout.

7 Claims, 2 Drawing Sheets

(51) Int. Cl.
*G08G 1/0967* (2006.01)
*G08G 1/16* (2006.01)

(52) U.S. Cl.
CPC ..... *G08G 1/0145* (2013.01); *G08G 1/096783* (2013.01); *G08G 1/164* (2013.01); *G08G 1/166* (2013.01); *G08G 1/167* (2013.01)

(58) Field of Classification Search
CPC ........ G08G 1/164; G08G 1/166; G08G 1/167; G08G 1/096725; G08G 1/096741
See application file for complete search history.

(56) References Cited

U.S. PATENT DOCUMENTS

| | | | |
|---|---|---|---|
| 2013/0304279 | A1 | 11/2013 | Mudalige et al. |
| 2017/0025005 | A1* | 1/2017 | Barth ..................... G08G 1/166 |
| 2019/0215668 | A1 | 7/2019 | Kenane |
| 2020/0047771 | A1* | 2/2020 | Yoon ................... B60W 60/001 |
| 2020/0160704 | A1 | 5/2020 | Choi et al. |
| 2020/0164874 | A1* | 5/2020 | Zhao ............... B60W 30/18159 |
| 2020/0272159 | A1* | 8/2020 | Zhang ....................... G08G 1/22 |
| 2020/0320869 | A1* | 10/2020 | Malhan .................... G08G 1/07 |

FOREIGN PATENT DOCUMENTS

| | | | |
|---|---|---|---|
| CN | 111243312 | A | 6/2020 |
| DE | 102015219467 | A1 | 4/2016 |
| DE | 102017201048 | A1 | 7/2018 |
| DE | 102018207823 | A1 | 11/2019 |
| DE | 102018219482 | A1 | 5/2020 |
| DE | 102019210218 | A1 | 1/2021 |
| WO | WO 2019233593 | A1 | 12/2019 |

OTHER PUBLICATIONS

International Preliminary Report on Patentability, mailed Dec. 15, 2022, for International Patent Application No. PCT/EP2021/063811. (7 pages).

* cited by examiner

METHOD FOR CONTROLLING A FLOW OF TRAFFIC ON A ROUNDABOUT

BACKGROUND

Technical Field

Embodiments of the invention relate to a method for controlling a flow of traffic on a roundabout. Furthermore, embodiments of the invention relate to a road side unit, which is configured as a traffic control unit.

Description of the Related Art

A direct V2X (vehicle to everything) communication, applications and methods of today, which are to cover more complex situations with multiple road users, only cover a portion of the required traffic mechanisms, such as "do not pass warning DNPW" or "emergency vehicle warning." However, in order that networked and automated driving can be safely implemented, all of the traffic scenarios have to be covered. Since networked and automated vehicles have to travel through roundabouts without interference in the future all the same, and/or can more efficiently travel through roundabouts, a method has to be developed, which covers this field. In V2X, there is the communication V2I (vehicle to infrastructure), where vehicles communicate directly with infrastructure elements. In such a communication, RSUs (road side units) play an important role and can serve, e.g., as virtual traffic lights and/or information distributors. These RSUs get information via the network from the road users in the range and distribute the relevant information to the road users concerned therewith, such as jam information to road users, which approach a jam.

Thus, from DE 10 2017 201 048 A1, a method for controlling the flow of traffic on a roundabout is for example known, wherein an entry point of time is ascertained by means of sensor data evaluation and communication between autonomous vehicles.

From U.S. 2019 215 668 A, an assistance system for autonomous vehicles is known, wherein autonomous vehicles receive sensor assistance data from an infrastructure in the area of a roundabout.

From WO 2019 233 593 A1, a system for controlling autonomous vehicles is known, wherein vehicles communicate with a server in the area of a roundabout, which calculates an order with respect to an entry into the roundabout and transmits it to the vehicles.

From DE 10 2019 210 218 A1, a method for controlling a flow of traffic on a roundabout is known, in which an entry of an ego vehicle into the roundabout is controlled based on traffic information of multiple road users, such that a need to decelerate upon the entry of the ego vehicle into the roundabout can be reduced.

BRIEF SUMMARY

Some embodiments relate to management of resources of a roundabout to guide a flow of traffic of road users through the roundabout without interference.

The traffic control unit receives messages from the road users, based on which route data of the road users can be ascertained for their travel through the roundabout. If a road user approaches the roundabout, it can share data with respect to its current position and/or its destination with the traffic control unit in order that the traffic control unit can determine a route optimized according to a predetermined optimization criterion (path length, time, economy) for the road user, on which the road user can travel through the roundabout from an entry or an entrance up to a certain exit of the roundabout. For example, the route data can be calculated by an algorithm, which is implemented in the traffic control unit and can be taken from the prior art relating to the flow of traffic optimization.

In some embodiments, a method for controlling a flow of traffic on a roundabout is provided. The flow of traffic of road users on the roundabout is controlled by a traffic control unit. In other words, resources of the roundabout are managed by the traffic control unit. The resources include a route of a vehicle on the roundabout and/or a lane of the roundabout, on which the road users can be guided. The resources include a throughput capacity of the roundabout (road users per minute). The road users can approach the roundabout and therein be connected to the traffic control unit via a network, which allows a communication between the road users and the traffic control unit. The communication can be effected by means of messages, which can be generated by the road users and/or the traffic control unit. In other words, the messages can be exchanged in the network between the road users and the traffic control unit to control the flow of traffic or the road users through the roundabout. For entry, a road user transmits a predetermined message with a request to the traffic control unit. The message can include a request, which can be transmitted to the traffic control unit via the network, to have available or request the resources of the roundabout.

For example, the network can be a V2X (vehicle to everything) network and/or a V2I (vehicle to infrastructure) network and/or a general ad-hoc communication network, which represent examples. Generally, it is a radio-based communication network. The traffic control unit can for example be a road side unit, RSU, which serves as a resource manager on the roundabout. The RSU can have an overview of the roundabout, e.g., by support of cameras or generally of at least one local sensor (e.g., radar sensor or LIDAR sensor or infrared sensor), which can respectively be provided by one of the road users and/or can be fixedly installed on the roundabout. The messages can for example each represent the described request and/or a current position and/or route of a vehicle. Messages with a position and/or route can also be repeatedly generated by road users, while they are located on the roundabout. In summary, the messages can thus contain a current position and/or a calculated or planned route of a and/or for a road user entering the roundabout and/or traveling on the roundabout and/or a request of an entering road user and/or a control signal (e.g., a waiting command) sent by the traffic control unit.

The roundabout is a multi-lane roundabout.

Before entry of the respective road user, therefore, the flow of traffic on the roundabout is determined at least based on the messages. The messages, which are sent by the road users, allow the traffic control unit to recognize the current flow of traffic and/or a jam on the roundabout. Alternatively and/or additionally, based on the sensor data of the sensors employed on the roundabout, the traffic control unit can determine when which road user will arrive at the roundabout and/or where it is located on the roundabout. The sensors can for example include at least one radar sensor and/or infrared sensor and/or LIDAR sensor.

For the respectively currently entering road user, a message with a control signal is generated. In other words, the traffic control unit can transmit a control signal to the respective road user to determine if and/or when the resources of the roundabout are made available to the road user. For example, the control signal can represent a waiting signal, which instructs the road user at the roundabout to wait. Alternatively or additionally, the control signal can represent a release signal, which means that the road user is allowed to enter the roundabout.

By the message, it is communicated to the respective road user when (in which time window) and/or along which route the road user can enter the roundabout. In other words, the message transmitted by the traffic control unit can contain one of two possible control signals and/or outputs: 1). The message can contain the waiting signal if the resources of the roundabout are currently not freely available and/or a jam exists on the roundabout; 2). The message represents the release signal for entering and/or resource data, which can be used by the entering road user to travel on the roundabout such that it is matched with other road users. The resources describe a lane and/or a complete route and/or a partial section of a lane (lane segment), on which the road user is to travel on the roundabout. The second possible output (release signal) can be effected if a jam on the roundabout is not ascertained by the traffic control unit.

In some embodiments, the advantage arises that the resources of the roundabout are managed such that the flow of traffic through the roundabout can be ensured and/or controlled with low risk of jam.

An embodiment provides that the road users on the roundabout emit messages with positioning data and/or destination data and/or route data of the respective road user. In other words, the positioning data can indicate, where the respective road user is currently located in relation to the roundabout and/or where the entered road users are located on the roundabout. The route data can describe lanes of the roundabout, which have been planned or assigned by the traffic control unit for a travel of a vehicle through the roundabout. The embodiment has the advantage that the traffic control unit can determine when which road user can or is to enter the roundabout, by the positioning data and the route data of the road users in order that resources of the subsequent road users can be assigned for the travel through the roundabout.

For example, the road users can be motor vehicles and/or bicycles. Therein, road users can represent vehicles, which are located on the roundabout and/or approach the roundabout. The road users can represent those vehicles, which are connected to the traffic control unit via a network and/or which can transmit the messages to the traffic control unit.

An embodiment provides that for controlling the roundabout, routes of all of the road users are determined and/or adapted in order that the flow of traffic on the roundabout is guided without accident. In other words, the traffic control unit can ascertain current, actually used routes and/or routes to be traveled in the future of the networked road users based on the messages. Alternatively and/or additionally, the road users can get assigned alternative routes for the roundabout if a jam occurs on the roundabout and/or a preceding vehicle on the roundabout fails or has a breakdown. For example, the alternative routes can provide a lane change. Hereby, the advantage arises that the flow of traffic through the roundabout can flow without accident and in uninterrupted manner because the resources of the roundabout can be adapted. Thus, the traffic control unit generally functions as a common route planner (path planning) or trajectory planner (path and speed planning) for the road users, which entails the advantage that the behavior of the respectively other road users is known and/or can be centrally matched.

An embodiment provides that it is determined by the traffic control unit at least based on the messages if a jam is present or has developed on the roundabout and/or the approaching road user is allowed to enter the roundabout. In addition to the messages, sensor data of at least one sensor of the traffic control unit and/or the road users can also be used. In other words, the traffic control unit can ascertain a current traffic situation of the roundabout based on sensor data to be able to decide if and/or when the entering road user or road user waiting at the roundabout is allowed to enter the roundabout. If a jam on the roundabout is ascertained, the entering road user can be instructed to wait at the roundabout. The jam can be recognized or detected based on the messages and/or sensor data if the positioning data of the road users on the roundabout do not change in time. Alternatively and/or additionally, the jam can be determined based on a travel time of at least one road user, which the road user has traveled on the roundabout. The travel time in case of a jam can be longer than a travel time without jam. The embodiment has the advantage that the traffic of the entering road users can be controlled based on the determination of the current traffic situation and/or a jam on the roundabout.

An embodiment provides that priority is assigned to the entering road user before another entering road user according to a temporal order of the requests thereof. In other words, the traffic control unit can instruct an entering road user to wait a certain time at the roundabout. The traffic control unit can provide a time window to each entering road user, in which the road user has to wait at the roundabout or in which it has to enter. The waiting time and/or the time window for the first arriving road user at the roundabout can differ from the waiting time for the subsequent road user. The waiting time can depend on the traffic situation on the roundabout. Hereby, the advantage arises that the arriving traffic at the roundabout can be controlled such that a matched waiting time can be achieved for each entering road user.

An embodiment provides that the traffic control unit assigns a rank to each road user, wherein a priority and/or subordination with respect to at least one different road user arises by the rank, and the flow of traffic on the roundabout is controlled based on the priorities and/or subordinations of the road users. In other words, the traffic control unit can distribute the resources of the roundabout to the road users, such as based on the positioning and/or time of arrival at the roundabout and/or the planned routes of the road users. Here, the positioning or position of a road user at the roundabout can represent an entrance or an entry to the roundabout, at which the road user is located, to travel into the roundabout. Additionally or alternatively, a priority can be assigned to the entering road user, which has first arrived at the roundabout. Alternatively and/or additionally, the priority of an entering road user can depend on the fact that a jam does not arise on the planned route of the entering road user. Alternatively and/or additionally, the flow of traffic of the roundabout can be controlled according to preset rules of the ranking between the entering road users and the entered road users. An entering road user can for example have subordination with respect to a road user already entered into the roundabout. Additionally or alternatively, the rank can depend on whether a road user is an ambulance or a private vehicle, wherein the former has priority. Thus, the rank can generally be determined by a vehicle type (emergency vehicle or private vehicle or convoy vehicle). Hereby, the advantage arises that the flow of traffic and/or the resources of the roundabout can be controlled without conflict by the application of the rules of priority and that a waiting time for priority road users can be avoided.

The already described control signal can for example represent an entry instruction, which can contain information relating to the assigned route and/or the assigned lane of the roundabout and/or the rank of the road user. Hereby, the advantage arises that the resources of the roundabout can be managed such that a jam cannot occur on the roundabout when an entering road user obtains a permission to travel into the roundabout.

However, in a different situation, the said control signal can also instruct an entering road user to wait at the roundabout for a certain time and/or until reception of an entry instruction. Alternatively and/or additionally, the waiting message can be generated if a jam is ascertained on the roundabout. Hereby, the advantage arises that the arriving flow of traffic and the entering road users at the roundabout, respectively, can be controlled by the control signal.

A traffic control unit may be configured to perform the steps, relating to the traffic control unit, of the method described herein. In other words, a flow of traffic on a roundabout can be controlled by the traffic control unit. Hereto, the traffic control unit can comprise a data processing device or a processor device, which is configured to perform the steps of the method. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured to perform the embodiment of the method described herein upon execution by the processor device. The program code can be stored in a data storage of the processor device.

The traffic control unit can be a road side unit in an embodiment.

In some embodiments, the features of multiple of the described embodiments are respectively combined as far as the embodiments have not been described as mutually exclusive.

DETAILED DESCRIPTION

Figure 1:
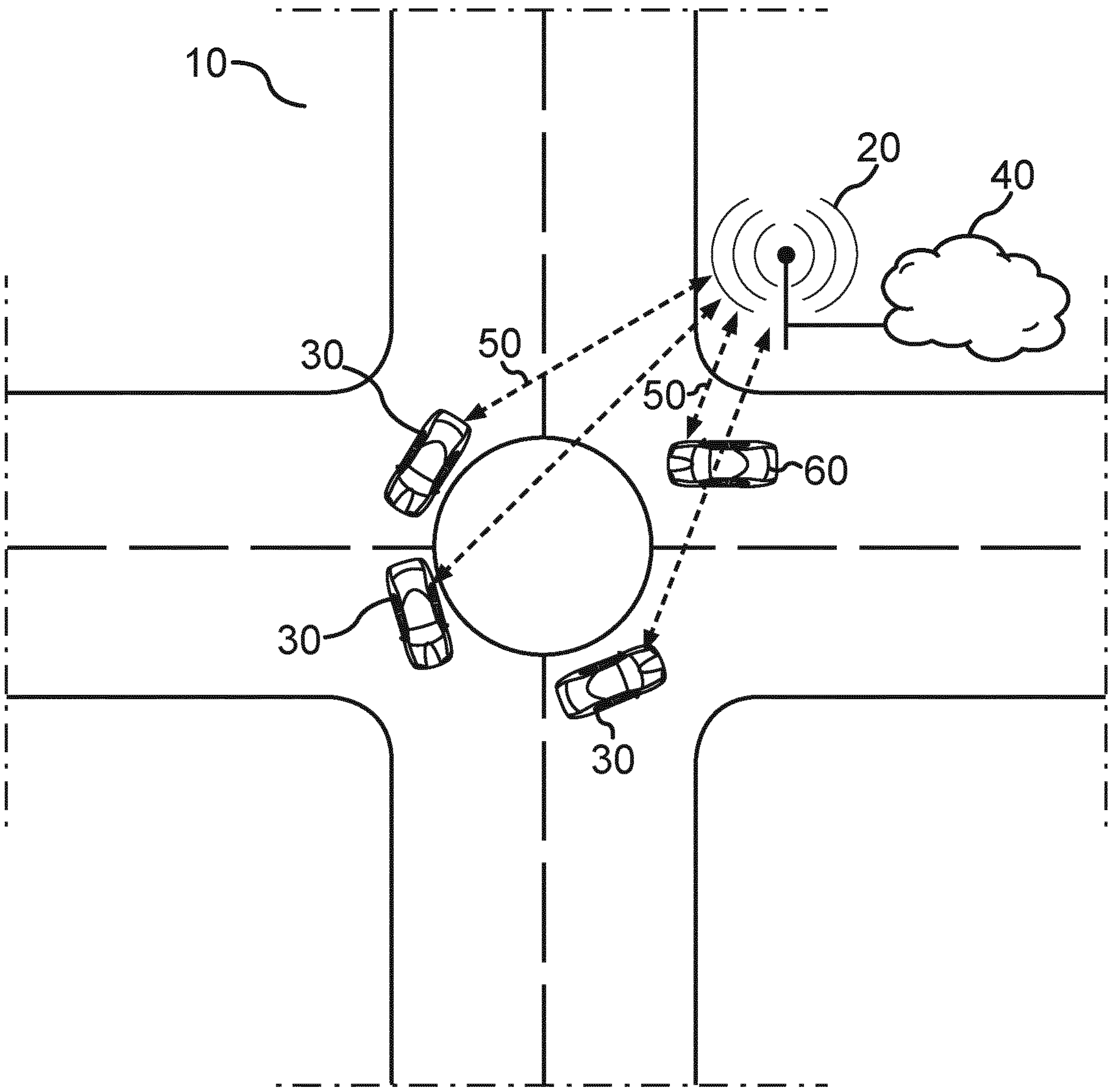
FIG. 1 shows a schematic representation for illustrating an embodiment of a method.

In the embodiments described herein, the described components of the embodiments each represent individual features to be considered independently of each other, which also each develop embodiments independently of each other. Therefore, the disclosure is to include also combinations of the features of the embodiments different from the illustrated ones. Furthermore, the described embodiments can also be supplemented by further ones of the already described features.

In the figures, identical reference characters each denote functionally identical elements.

FIG. 1 shows a traffic control unit 20, by which the flow of traffic on a roundabout 10 can be guided. The flow of traffic can include road users 30, 60, which have entered the roundabout 10 and/or approach the roundabout 10 to enter it. The road users 30, 60 can for example be cars, in particular passenger cars and/or a passenger bus. The road users 30, 60 can be autonomously driving cars and/or cars driven by persons and/or they can be motorcycles and/or bicycles.

The traffic control unit 20 can be a road side unit, which can be employed on and/or at the roundabout 10. The traffic control unit 20 can include a processor (not illustrated). The traffic control unit 20 can serve as a resource manager or user manager to control the resources of the roundabout 10 and/or the flow of traffic of the road users 30, 60 through the roundabout 10. The resources of the roundabout 10 can for example represent lanes and/or lane segments and/or routes of the road users 30, 60 from entering until exiting the roundabout 10.

The road users 30, 60 can be connected to the traffic control unit 20 via radio links in a data network or briefly network 40, via which they can communicate with each other. For example, the network 40 can be a V2X (vehicle to everything) network and/or V2I (vehicle to infrastructure) and/or V2V (vehicle to vehicle) and/or another communication network. The road users 30, 60 can communicate with the traffic control unit 20 by means of messages 50 via the network 40. The messages 50 can be transmitted by the road users 30, 60 and/or the traffic control unit 20. The messages 50 can contain current positioning data of the road users 30 and/or route data for the road users 30 if they are sent or guided by the road users 30. The messages 50, which are sent by the traffic control unit 20, can for example contain an instruction and/or a control signal, by which the flow of traffic of the roundabout can be controlled.

By the messages 50 of the road users 30, the traffic control unit 20 can determine when which road user 30 arrives at the roundabout 10 and/or where it is located on the roundabout 10. By the positioning data and destination data of the road users 30, which the road users 30 transmit to the traffic control unit 20 via the network 40, the traffic control unit 20 can determine when which arriving road user 60 can enter the roundabout. In addition, the traffic control unit 20 can use this data to determine a route or generally resources of the road users 60 for the subsequent travel through the roundabout 10. Thus, a resource assignment to the road users 60 is effected.

If an entering road user 60 approaches the roundabout 10, it can emit a message 50 to the traffic control unit 20. The message 50 of the entering road user 60 can contain a request for entering and/or information relating to the current position of the road user 60 and/or a planned destination and/or direction of travel or target exit of the entering road user 60. Based on the messages 50 and/or sensor data of the entered road users 30, the traffic control unit 20 can ascertain the current traffic situation, e.g., a jam and/or the availability of the resources of the roundabout 10. Based on the current traffic situation of the roundabout 10, the traffic control unit 20 can generate a message 50, which can be sent to the entering road user 60.

This message 50 of the traffic control unit 20 can contain a corresponding control signal, by which it is communicated to the entering road user 60 if it can enter the roundabout 10 or has to wait at the roundabout 10. This message 50 can contain route data of the route to be traveled or generally resource data of the resources assigned to the road user. The control signal can represent an instruction for entering or an entry signal for the entering road user 60 if a jam is not present on the roundabout 10 and/or the resources of the roundabout 10 are freely available. The control signal can represent a waiting message or a waiting signal for the entering road user 60 if the resources of the roundabout 10 are fully exhausted and/or a jam on the roundabout 10 is ascertained by the traffic control unit 20.

The traffic control unit 20 can select the resources of the roundabout 10 to be used and/or the route data of the road users 30 by the message 50 such that the flow of traffic through the roundabout 10 can be ensured without delay and/or without accident. By the route data, it can for example be considered when a road user 30 has a breakdown on the roundabout 10 and/or an accident occurs on the roundabout 10. In such a case, alternative routes or alternative lanes in case of a multi-lane roundabout 10 can be provided to the subsequent road users 30. Hereto, an adaptation of the association of the resources of the roundabout 10 is effected. The adaptation of the association of the resources of the roundabout 10 can also be effected if a road user 30, 60 with a certain priority has to travel through the roundabout 10. For example, the road users, which are involved with rescue services, can have priority with respect to the normal traffic. The lanes or routes, which are currently used by the entered road users, can be released and/or adapted in order that the road users for the rescue services can travel through the roundabout without having to stop. A road user for a rescue service can be an ambulance and/or a police vehicle and/or a fire truck.

The traffic control unit 20 can also serve as a virtual traffic light 80, by which the flow of traffic through the roundabout 10 can be controlled in case of high traffic densities or multiple entering road users 60 per direction to the roundabout 10. In other words, a control signal of the traffic control unit 20 can serve as a green light or a red light for controlling the entering traffic.

Figure 2:
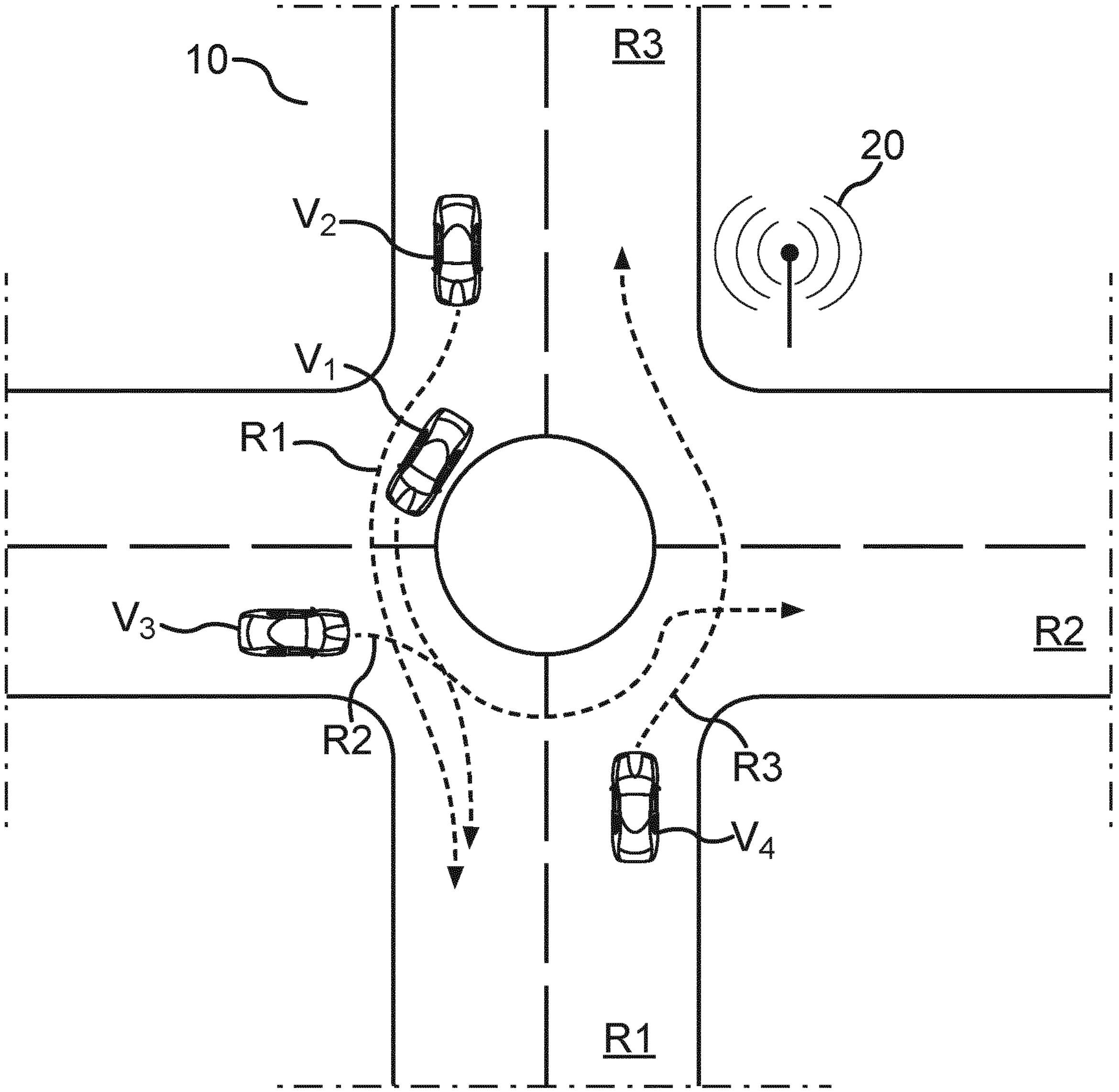
FIG. 2 shows a schematic representation for controlling the roundabout based on priorities and subordinations of the road users.

FIG. 2 shows a roundabout 10, through which the road users V1, V2, V3, V4 can be guided by the traffic control unit 20 based on a ranking with priority and/or subordination. The priorities and/or subordinations can be preset by rules, which can already be provided to the traffic control unit 20. Here, the general traffic regulations for guiding the road users V1, V2, V3, V4 through the roundabout 10 based on priorities or subordinations can apply (e.g., a roundabout with "yield to the right"). The road user V1, which has already traveled on the roundabout 10, can for example have priority with respect to the entering road users 60. Additionally or alternatively, the ranks can be determined by a respective category of the road users (e.g., rescue service or private).

Based on the messages 50 of road users V1, V2, V3, V4, the traffic control unit 20 can ascertain route data currently required by the road users V1, V2, V3, V4 and thus ascertain how the road users V1, V2, V3, V4 have to behave on the roundabout 10 to obtain a coordination. The route data can for example describe lanes and/or lane segments and/or routes of the roundabout 10, on which the road users V1, V2, V3, V4 have to travel through the roundabout 10. The routes R1, R2, R3 can be assigned to the road users V1, V2, V3, V4 by the traffic control unit 20.

In an embodiment, the routes R1, R2, R3 of the roundabout 10 for the road users V1, V3, V3, V4 only have to be planned by the traffic control unit 20 if the road users V1, V2, V3, V4 obtain a message for entering from the traffic control unit 20. The entering road users V2, V3, V4 each follow the routes R1, R2, R3. The entered road user V1, which travels on the route R1, can have priority with respect to the road users V2, V3 and further travel through the roundabout 10. The entering road users V2, V3 have to wait since the route R1 can be traveled by the road user V1. The entering road users V2, V3 can receive a waiting message from the traffic control unit 20 in order that a risk of accident can be avoided. Since the route R3 is not planned for the entered road user V1, this resource is available, and thus it can be signaled to the entering road user V4 by the traffic control unit 20 to travel on without having to wait at the roundabout 10.

The traffic control unit 20 can define a time window in the waiting message, in which the road users V2, V3 have to wait at the roundabout. For example, the time window can be 30 or 60 for example in a time range of 5 to 60 seconds. The time window can be determined by the traffic control unit 20 based on the current positioning and/or speed of the road user V1. The entering road user V2 can for example have a small time window for waiting with respect to the road users V3 and V4 because the road user V2 has to follow the road user V1 or travel on the same route. The time window can be increased if the entered road user V1 moves very slowly or with a speed on the roundabout 10, which is lower than a normal or admissible speed. The slow speed can for example be in the range from 0 (breakdown or jam) to 30 km/h. The time window can also depend on the fact if the entered road user V1 has signaled to the traffic control unit 20 that it has arrived at the exit. In other words, the traffic control unit 20 can ascertain exiting the roundabout 10 by the road user V1 based on the messages 50 and/or sensor data in order that the time window can be calculated and/or adapted for respectively entering road users. The time window for the entering road users V2, V3 can for example be decreased if the traffic control unit 20 already knows that the road user V1 has traveled through the roundabout 10. The time window for the entering road users (e.g., V3) can then be calculated depending on route data and/or destination data and/or parameters of the next following entered road user (e.g., V2), which can be ascertained in real time. The real-time parameters can for example represent an instantaneous speed and/or current positioning of the entered road user. By the route data and the real-time parameters of the entered road user V2, the traffic control unit 20 can calculate or estimate a travel time, which the road user V2 requires to exit the roundabout 10 or to release the resources (e.g., use of lanes) of the roundabout 10, which can be assigned to the entering road user V3. After elapse of the waiting time determined in the time window, it can be signaled to the respectively entering road users to enter the roundabout 10. The traffic control unit can first signal to V2 for entering because it can travel behind V1 through the roundabout 10. The time window can be calculated with an algorithm in the traffic control unit 20.

It can be signaled to the entering road user V2 to wait if the road user V3 has entered the roundabout 10 or has previously obtained a green light for entering. The road user V3 can obtain a waiting message for waiting from the traffic control unit 20 if the road user V4 has entered the roundabout 10. Since the traffic control unit 20 can determine the exact positioning of the entered road users based on the messages 50, the entering traffic can be controlled such that the use of the resources can also be optimized.

In order that automated road users can be safely guided through a roundabout, thus, the employment of an RSU may be provided. The RSU serves as a user manager and resource manager and has an overview of the environment by, e.g., support of cameras. By usual V2X messages, an RSU receives the information of the different networked road users and can calculate from it when which road user arrives at the roundabout or where it is located on the roundabout. By positioning data and route data, which the road users transmit to the RSU via V2X, the RSU can determine when which road user can or is to enter the roundabout, and uses this data to determine the route and resources of the subsequent road users for the travel through the roundabout. Since the RSU knows about all users, it can better divide the resources and lead the road users to the correct lanes and possibly give priorities and subordinations to further keep the traffic flowing. This system functions for all types of roundabouts.

By this technique, a possibility of guiding automated and networked vehicles through roundabouts of all kinds arises. The control unit RSU (traffic control unit) calculates the best routes of all of the users and assigns them to each road user. It also helps the traffic flow increase and accident reduction.

Overall, the examples show how a method for controlling a flow of traffic on a roundabout can be provided.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for controlling a flow of traffic on a roundabout, wherein the flow of traffic is controlled by a traffic control unit, with which road users, which have entered the roundabout and/or approach the roundabout to enter the roundabout, are networked in a network and communicate via messages, and wherein for entering, each road user of the road users transmits a request to the traffic control unit, the method comprising:

before entry of each road user, determining, by the traffic control unit, the flow of traffic on the roundabout based on previous messages received via a radio-based communication network from each user and sensor data received via the radio-based communication network from at least one of a camera, a radar sensor, a Light Detection and Ranging (LIDAR) sensor, or an infrared sensor on the roundabout;

ascertaining, by the traffic control unit, real-time parameters including an instantaneous speed and current positioning of each road user based on the previous messages;

calculating, by the traffic control unit, a travel time required to exit the roundabout for each road user in real time using the real-time parameters;

generating, by the traffic control unit, based on the travel time required to exit the roundabout calculated for each road user, a control signal for each road user as a message for the road user to communicate to the road user when and/or along which route the road user is to enter and/or traverse the roundabout;

managing, by the traffic control unit, resources of the roundabout, wherein the resources describe a lane or a partial section of the lane, on which the road user is to travel, and the message represents data of the resources that are to be used by the road user to travel on the roundabout such that the road user is matched with other road users;

assigning, by the traffic control unit, the road users one or more alternative routes for the roundabout in response to determining that a jam occurs on the roundabout and/or a preceding vehicle on the roundabout fails or has a breakdown, wherein the one or more alternative routes provide a lane change such that the flow of traffic through the roundabout flows without accident and in uninterrupted manner because the resources of the roundabout are adapted;

assigning, by the traffic control unit, a rank to each of the road users, wherein a priority and/or subordination with respect to at least one different road user results by the rank, and transmitting the control signal generated for each road user, wherein the control signal for at least one priority road user contains a first instruction for the at least one priority road user to enter the roundabout using a particular lane, wherein the control signal for the road users other than the at least one priority road user contains a second instruction for the road users other than the at least one priority road user to wait, and wherein, when the at least one priority road user follows the first instruction and the road users other than the at least one priority road user follow the second instruction, a waiting time for entering the roundabout of at least one priority road user is avoided.

2. The method according to claim 1, wherein the road users on the roundabout emit messages with positioning data and/or destination data and/or route data of the respective road user.

3. The method according to claim 1, wherein routes of all of the road users are determined and/or adapted by the traffic control unit for controlling the roundabout in order that the flow of traffic is guided on the roundabout without accident.

4. The method according to claim 1, wherein the traffic control unit determines based on the messages if the jam is present on the roundabout and/or an entering vehicle is allowed to enter the roundabout.

5. The method according to claim 1, wherein priority is assigned to the road user before another road user according to a temporal order of the requests thereof.

6. A traffic control unit that controls a flow of traffic on a roundabout, the traffic control unit comprising:

a processor; and a storage medium storing program code that, when executed by the processor, causes the traffic control unit to:

receive, from each road user of a plurality of road users, a request;

before entry of each road user, determine the flow of traffic on the roundabout based on previous messages received via a radio-based communication network from each user and sensor data received via the radio-based communication network from at least one of a camera, a radar sensor, a Light Detection and Ranging (LIDAR) sensor, or an infrared sensor on the roundabout, ascertain real-time parameters including an instantaneous speed and current positioning of each road user based on the previous messages;

calculate a travel time required to exit the roundabout for each road user in real time using the real-time parameters;

generate, based on the travel time required to exit the roundabout calculated for each road user, a control signal for each road user as a message for the road user to communicate to the road user when and/or along which route the road user is to enter and/or traverse the roundabout, manage resources of the roundabout, wherein the resources describe a lane or a partial section of the lane, on which the road user is to travel, and the message represents data of the resources that are to be used by the user to travel on the roundabout such that the road user is matched with other road users, assign the road users alternative routes for the roundabout in response to determining that a jam occurs on the roundabout and/or a preceding vehicle on the roundabout fails or has a breakdown, wherein the alternative routes provide a lane change such that the flow of traffic through the roundabout flows without accident and in uninterrupted manner because the resources of the roundabout are adapted, assign a rank to each road user, wherein a priority and/or subordination with respect to at least one different road user results by the rank, and transmit the control signal generated for each road user, wherein the control signal for at least one priority road user contains a first instruction for the at least one priority road user to enter the roundabout using a particular lane, wherein the control signal for the road users other than the at least one priority road user contains a second instruction for the road users other than the at least one priority road user to wait, and wherein, when the at least one priority road user follows the first instruction and the road users other than the at least one priority road user follow the second instruction, a waiting time for entering the roundabout of at least one priority road user is avoided.

7. The traffic control unit according to claim 6, wherein the traffic control unit is a road side unit.

* * * * *